R. F. & C. H. GASTON.
SURFACE MULCHER.
APPLICATION FILED AUG. 31, 1914.
1,145,136.
Patented July 6, 1915.
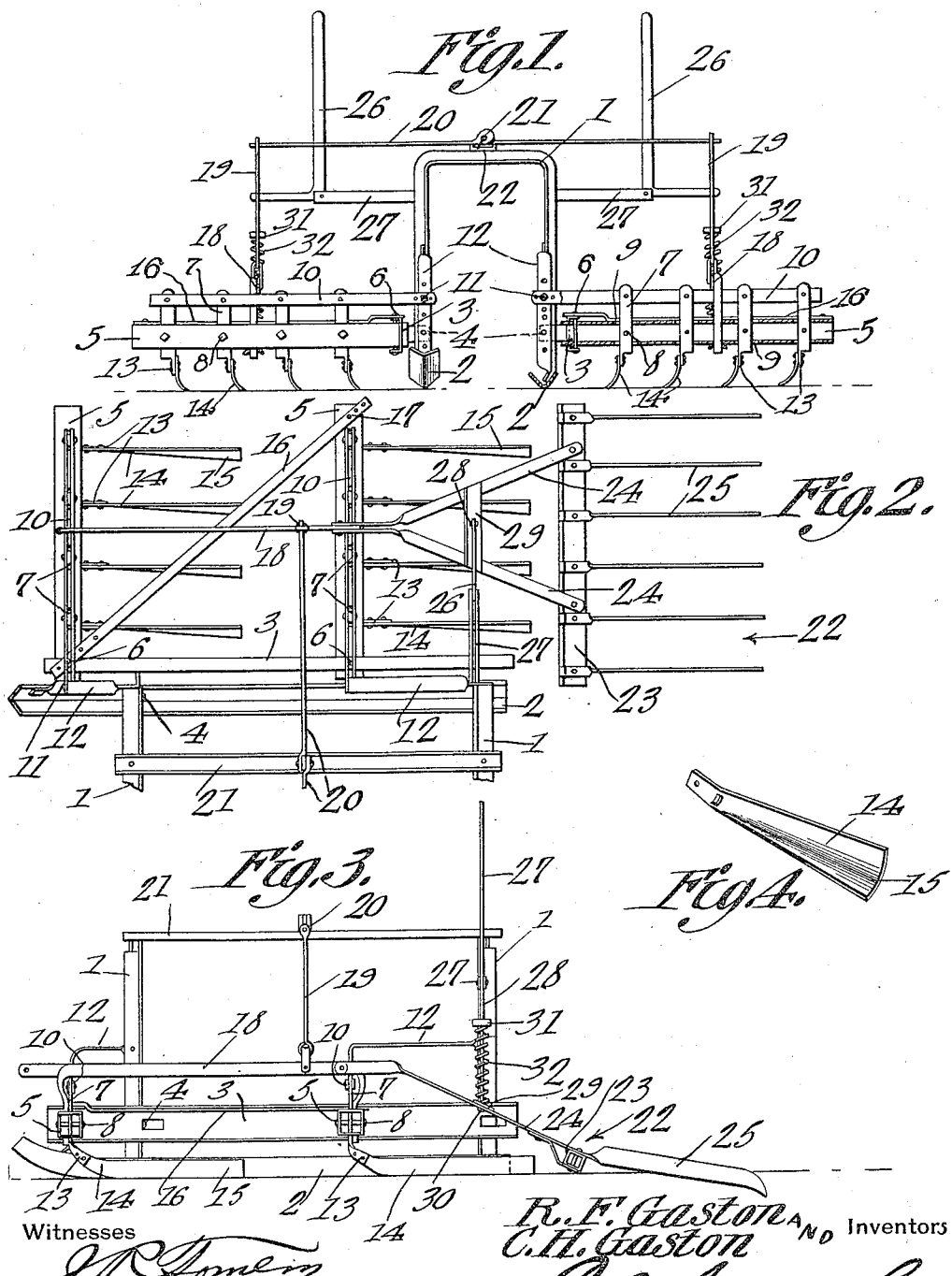
Witnesses
R. F. Gaston
C. H. Gaston
Inventors
by
Attorneys

UNITED STATES PATENT OFFICE.

RALPH F. GASTON AND CRETH H. GASTON, OF WOODWARD, OKLAHOMA.

SURFACE-MULCHER.

1,145,136.   Specification of Letters Patent.   Patented July 6, 1915.

Application filed August 31, 1914. Serial No. 859,500.

*To all whom it may concern:*

Be it known that we, RALPH F. GASTON and CRETH H. GASTON, citizens of the United States, residing at Woodward, in the county of Woodward, State of Oklahoma, have invented a new and useful Surface-Mulcher, of which the following is a specification.

The present invention appertains to soil working implements, and aims to provide a novel and improved apparatus for mulching or pulverizing the surface of the soil to provide a granulated mulch upon the surface for preventing an evaporation of the moisture from the subsoil, whereby the soil will retain its moisture, and whereby the mulched surface will otherwise be of advantage.

The present invention contemplates the provision of a soil working implement embodying unique means for adjusting the blades or soil working elements in various manners to conform to listed furrows and other irregularities in the soil, if they exist, and to render the blades or soil working elements effective under the various conditions.

It is also within the scope of the invention to provide a surface mulcher or pulverizer which will be improved generally in its construction to enhance the utility thereof.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment, in the accompanying drawing, wherein:—

Figure 1 is a front view of the improved structure, portions being shown in section. Fig. 2 is a plan view of the right hand side or wing of the device, the left hand side portion or wing being broken away since it is a mere duplication. Fig. 3 is a side elevation of the device. Fig. 4 is a perspective view of one of the blades or soil working elements.

In carrying out the invention, there is provided a frame embodying a pair of arches 1 having their lower ends secured to the longitudinal spaced runners 2, it being understood that the frame may be provided with a suitable seat for the operator, if desired, and may be provided with suitable means for drawing it over the soil which features need not be described or illustrated since they are common and well known.

Disposed at the sides of the arches 1, and above the runners 2, is a pair of longitudinal beams 3, which are pivotally connected to the limbs of the arches 1, as at 4, whereby the beams 3 may swing about the longitudinal axes, and to each beam 3 is pivoted or hinged a pair of laterally projecting bars or arms 5 which are preferably hollow or tubular. The inner ends of the bars or arms are pivoted or hinged to the beams 3, as at 6, whereby the bars 5 may swing forwardly and backwardly, while the beams 3 being pivotally mounted will enable the bars 5 to swing upwardly and downwardly.

Upright shanks or standards 7 have their intermediate portions pivoted to the bars 5, a series of the shanks or standards 7 being provided for each bar 5, and the standards or shanks 7, being pivoted within the bars 5 by means of pivots or hinge pins 8 which are engaged through the sides of the bars and through the intermediate portions of the shanks or standards 7. The upper and lower portions of the bars 5 are provided with slots 9 through which the shanks or standards 7 pass so as to enable the shanks or standards to oscillate about longitudinal axes and in transverse planes.

As a means for holding and swinging the shanks or standards 7, transverse links or strips 10 are pivoted to the upper ends or arms of the respective sets of standards or shanks 7, and have their inner ends adjustably connected, as at 11, to brackets 12 secured between the links of the arches 1 and the runners 2. The inner ends of the links 10 are pivotally connected to the brackets 12, whereby the links may oscillate vertically, and the connection of the links 10 with the brackets 12 is also sufficiently loose or flexible to enable the links 10 to swing backwardly and forwardly with the bars or arms 5.

The lower ends of the shanks or standards 7 are twisted and bent rearwardly and have the forward ends of the rearwardly projecting blades or soil working elements 14 adjustably engaged thereto, whereby the blades 14 will trail from the lower ends or arms of the standards or levers 7 and may be adjusted at various angles relative to the standards or levers 7. The rear or free portions of the blades 14 are curved as at 15, to create an effective cutting and stirring action upon the surface of the soil.

In order to hold the bars or arms 5 of each pair at various longitudinally set positions, a diagonal or oblique brace 16 has its forward end pivoted to the forward pivot or hinge pin 6 of the corresponding bar or arm 5, and has its rear end adjustably connected, as at 17, to the free end of the corresponding rear bar or arm 5. Thus, by adjusting the brace 16 relative to the rear arms or bars 5, the rear arms 5 may be held at various angular positions relative to the beams 3, and arched links 18 having their end portions pivotally engaged to the intermediate portions of the respective pairs of bars or arms 5 cause the forward bars or arms 5 to remain parallel with the rear ones as the rear arms are swung to various positions.

As a means for holding the side wings of the implement in various angular positions relative to the frame, hangers 19 connect the arched links 18 of the bars or arms 5, with the laterally projecting levers 20 which are adjustably mounted upon a longitudinal beam 21 secured upon the arches 1, whereby when the levers 20 are adjusted at various angles relative to the frame, the wings of the machine may be supported at various angular positions, the arched links 18 supporting the bars or arms 5 from the hangers 19.

In order to rake or even the surface of the soil, a rake 22 trails in rear of each wing of the device, and embodies a transverse bar 23 to which the rear ends of rearwardly diverging strips or bars 24 are secured, the forward or adjacent ends of the strips 24 being pivotally connected to the rear portion of the corresponding arched link 18 to enable the rake head to swing vertically. The rake teeth 25 are secured to the transverse bars 23 and have their rear or free ends curved downwardly to encounter the soil and trail thereon for the intended purpose.

As a means for adjustably supporting the rakes 22, hand levers 26 are fulcrumed to the arms or brackets 27 secured to the rear arch 1, and rods or hangers 28 are pivoted to the lower arms of the levers 26 and slidably engage through cross bars 29 secured to the respective strips 24, the lower ends of the rods or hangers 28 having heads or seats 30 upon which the cross bars 29 are seatable for supporting the rakes. Collars or seats 31 are secured upon the rods or hangers 28 and coiled wire expansion springs 32 are disposed between the cross bars 29 and collars 31 to yieldably depress the rakes whereby they may yieldably engage the soil when the levers 26 are swung so as to depress the rods or hangers 28.

In operation, the apparatus is adapted to be drawn over the soil by draft animals, in any suitable manner, and the arches 1 enable the device to straddle or run aside a row of plants, with the wings carrying the soil working elements at the opposite sides of the row for working the soil. The trailing blades or soil working elements 14 will thoroughly granulate and work the superficial portion of the soil, and will cut or sever the sod, weeds or other vegetation, so that a granulated mulch is provided over the sub-soil for the desired purposes. The rakes 22 trailing in rear of the right and left hand sets of blades 14 will serve to rake or even the mulched soil.

When the soil is level, the levers 20 may be set to hold the bars or arms 5 horizontal, as seen in Fig. 1, and when the soil is irregular or when the device is to be drawn in listed furrows, the bars or arms 5 may be swung upwardly and downwardly properly by adjusting the levers 20 to this end, it being noted that the bars or arms 5 being carried by the beams 3 will enable the said bars or arms to swing vertically. By adjusting the braces 16, the arms 5 may also be swung forwardly and rearwardly to properly position the blades 14, and by adjusting the links 10 with respect to the brackets 12 on arches 1, the angular positions of the standards or shanks 7 may be adjusted to vary the lateral inclination or positions of the blades 14 under various conditions. It will be noted that the links 10 being pivoted to the brackets 12, parallel with the arms 5, will serve to hold the standards or shanks vertical as the arms 5 are swung upwardly and downwardly, although the links 10 may be adjusted relative to the brackets 12 when it is desired to swing the standards or shanks 7 laterally.

Having thus described the invention, what is claimed as new is:—

1. In a soil working implement, a frame, a vertically swinging arm pivotally connected thereto, shanks pivoted to the said arm, blades carried by the lower ends of the shanks, and a link pivoted to the shanks and to the frame.

2. In a soil working implement, a frame, a beam hinged thereto to swing about a longitudinal axis, arms pivoted to the beam, shanks pivoted to the arms to swing about the longitudinal axis, and blades carried by the lower ends of the shanks.

3. In a soil working implement, a frame, a beam hinged thereto to swing about a longitudinal axis, arms pivoted to the beam, shanks pivoted to the arms to swing about the longitudinal axes, blades carried by the lower ends of the shanks, and links pivoted to the shanks and to the frame.

In testimony that we claim the foregoing as our own, we have hereto affixed our signatures in the presence of two witnesses.

RALPH F. GASTON.
CRETH H. GASTON.

Witnesses:
MARY M. KEARNS,
C. R. BLECKLEY.

Copies of this patent may be obtained for five cents each, by addressing the "Commissioner of Patents, Washington, D. C."